(No Model.)
W. HASENBACH.
PROCESS OF SEPARATING THE TIN FROM SCRAP OR PIECES OF TIN PLATE OR TINNED IRON BY MEANS OF HYDROCHLORIC ACID.
No. 344,575. Patented June 29, 1886.
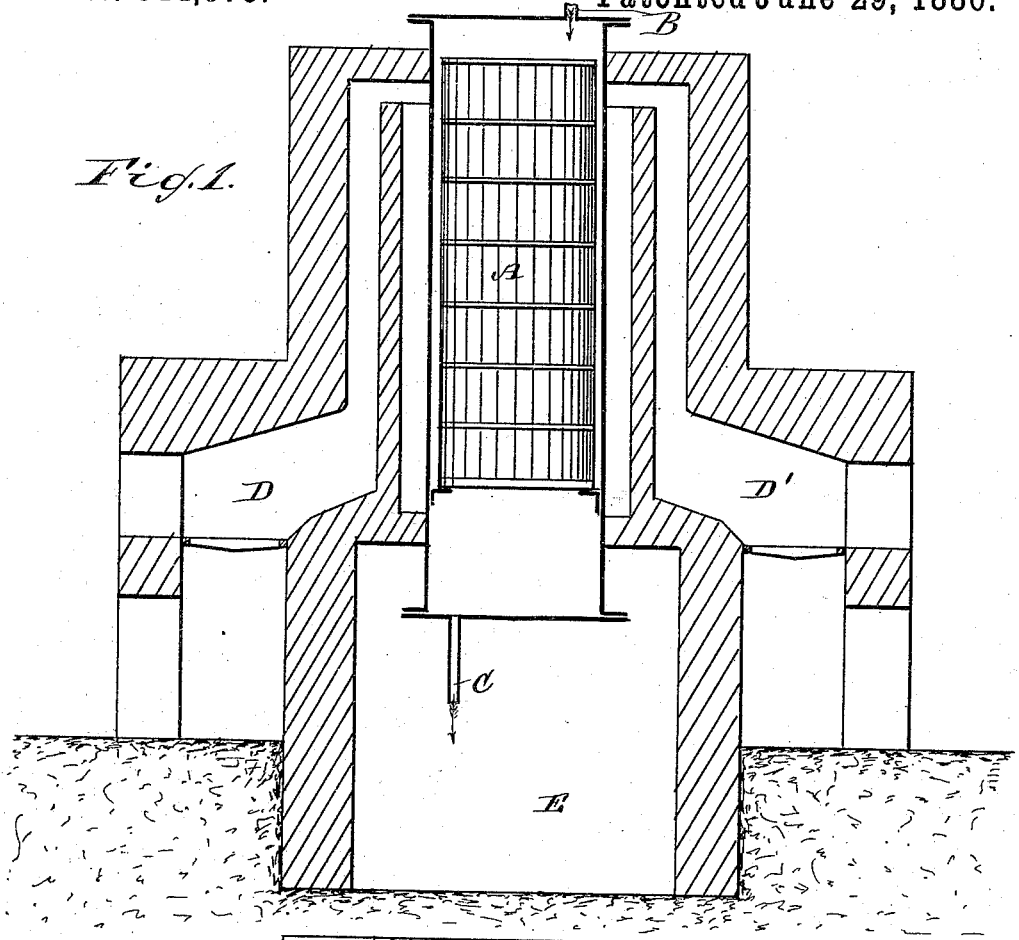
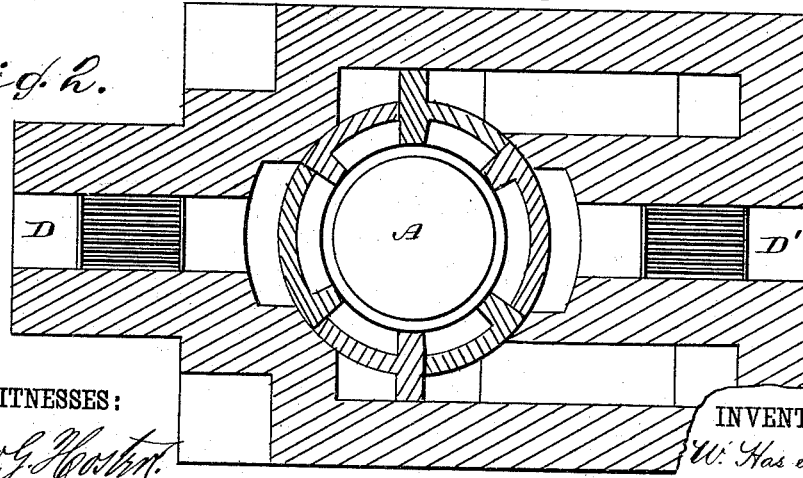
WITNESSES:
INVENTOR:
W. Hasenbach
BY Munn & Co
ATTORNEYS.

United States Patent Office.

WILHELM HASENBACH, OF MANNHEIM, GERMANY.

PROCESS OF SEPARATING THE TIN FROM SCRAP OR PIECES OF TIN-PLATE OR TINNED IRON BY MEANS OF HYDROCHLORIC ACID.

SPECIFICATION forming part of Letters Patent No. 344,575, dated June 29, 1886.

Application filed September 11, 1885. Serial No. 176,762. (No model.)

*To all whom it may concern:*

Be it known that I, WILHELM HASENBACH, doctor of philosophy, a citizen of Germany, and a resident of Mannheim, Germany, have invented new and useful Improvements in the Process of Separating the Tin from Scraps or Pieces of Tin-Plate or Tinned Iron by Means of Hydrochloric Acid, of which the following is a specification.

This invention has for its object to separate tin from tinsmiths' cuttings and other scraps or pieces of tin-plate, and comprises a process whereby protochloride of tin is formed.

According to the said invention the scraps or pieces of tin-plate are treated with gaseous hydrochloric acid at an elevated temperature.

Reference is to be had to the accompanying drawings, forming part of this specification, in which similar letters of reference indicate corresponding parts in both the figures.

Figure 1 is a cross-sectional elevation of an apparatus used in my improved process. Fig. 2 is a sectional plan view of the same.

In carrying out the improved process the scraps or pieces of tin-plate are placed in a suitable vessel, A, and heated to about 400° Celsius. The gaseous hydrochloric acid is then caused to pass through the said vessel, entering by the tube B and passing out by the tube C, and thus coming into contact with the scraps or pieces of tin-plate. The tin of the tin-plate combines with the hydrochloric acid and protochloride of tin and hydrogen are produced according to the formula

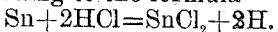

$$Sn + 2HCl = SnCl_2 + 2H.$$

The protochloride of tin thus produced distills off at the temperature to which, as above stated, the tin-plate is heated by the furnaces D D', and after being condensed in the space E can be worked up or utilized in any well-known or convenient manner.

The gaseous hydrochloric acid may be produced either by decomposing muriate of soda with sulphuric acid or by allowing a highly-watery solution of hydrochloric acid and concentrated sulphuric acid to run together into a suitable vessel, when hydrochloric-acid gas will be evolved in either case.

I am aware that tin scraps have been subjected to the action of muriatic or hydrochloric acid to separate the tin from the iron, and I therefore do not claim such invention.

I heat the tin scraps and subject them while hot to the action of hydrochloric acid in the form of a dry gas or vapor, whereby the protochloride of tin will be distilled off from the scraps, thereby avoiding the necessity of washing the scraps to remove the protochloride of tin, as is the case when treated with hydrochloric acid without the aid of heat.

I claim—

The herein-described process of separating tin from tinsmiths' cuttings and other scraps or pieces of tin-plate, consisting in heating the said cuttings, scraps, or other pieces of tin-plate and then subjecting the same in a heated state to hydrochloric acid in the form of gas or vapor, as specified.

In testimony whereof I have signed my name to this specification in the presence of two subscribing witnesses.

WILHELM HASENBACH.

Witnesses:
PETER NOTTI,
LOUIS F. CLÉRY.